(12) United States Patent
Natori

(10) Patent No.: US 9,983,737 B2
(45) Date of Patent: May 29, 2018

(54) DISPLAY DEVICE, DISPLAY METHOD, AND DISPLAY SYSTEM

(71) Applicant: Seiko Epson Corporation, Tokyo (JP)

(72) Inventor: Takashi Natori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 14/948,498

(22) Filed: Nov. 23, 2015

(65) Prior Publication Data

US 2016/0147377 A1    May 26, 2016

(30) Foreign Application Priority Data

Nov. 25, 2014    (JP) ................................. 2014-237404

(51) Int. Cl.
| | |
|---|---|
| G06F 3/033 | (2013.01) |
| G06F 3/042 | (2006.01) |
| G06F 3/0354 | (2013.01) |
| H04N 5/372 | (2011.01) |
| H04N 5/374 | (2011.01) |

(52) U.S. Cl.
CPC ........ G06F 3/0425 (2013.01); G06F 3/03545 (2013.01); H04N 5/372 (2013.01); H04N 5/374 (2013.01)

(58) Field of Classification Search
None
See application file for complete search history.

(56) References Cited

U.S. PATENT DOCUMENTS

| | | | |
|---|---|---|---|
| 2005/0157254 A1 | 7/2005 | Shinohara et al. | |
| 2013/0298029 A1* | 11/2013 | Natori | G06F 3/0484 715/731 |
| 2013/0300658 A1* | 11/2013 | Endo | G06F 3/0425 345/157 |

FOREIGN PATENT DOCUMENTS

| | | |
|---|---|---|
| JP | 2009-20536 A | 1/2009 |
| JP | 2013-235416 A | 11/2013 |

* cited by examiner

*Primary Examiner* — Ifedayo Iluyomade
(74) *Attorney, Agent, or Firm* — ALG Intellectual Property, LLC

(57) ABSTRACT

A projector includes: a display section that displays an image on a screen; a communicating section that communicates with an indicator that indicates a position on the screen; an acquiring section that acquires output destination information for specifying an output destination retained in the indicator through the communicating section; and an output control section that performs a control for outputting the image information to an output destination specified by the acquired output destination information.

8 Claims, 11 Drawing Sheets

| OUTPUT MEANS | OUTPUT DESTINATION | CONTROL CODE |
|---|---|---|
| PRINTING (24A) | USB PRINTER | 0 |
| | NETWORK PRINTER | 1 |
| STORAGE (24B) | USB MEMORY | 2 |
| | NETWORK SERVER | 3 |
| E-MAIL SENDING (24C) | FIRST OUTPUT DESTINATION | 4 |
| | SECOND OUTPUT DESTINATION | 5 |

| OUTPUT MEANS | CONTROL CODE | OUTPUT SETTING INFORMATION | |
|---|---|---|---|
| PRINTING | 0 | USB PRINTER 80 | 181 |
| | 1 | NETWORK PRINTER 50A | |
| STORAGE | 2 | USB PRINTER 71A | |
| | 3 | NETWORK SERVER 60 | |
| E-MAIL SENDING | 4 | MAIL RECEPTION TERMINAL MA | |
| | 5 | MAIL RECEPTION TERMINAL MB | |

| OUTPUT MEANS | OUTPUT DESTINATION | CONTROL CODE |
|---|---|---|
| PRINTING (24A) | USB PRINTER | 0 |
| | NETWORK PRINTER | 1 |
| STORAGE (24B) | USB MEMORY | 2 |
| | NETWORK SERVER | 3 |
| E-MAIL SENDING (24C) | FIRST OUTPUT DESTINATION | 4 |
| | SECOND OUTPUT DESTINATION | 5 |

| CONTROL CODE A | DISPLAY ATTRIBUTE INFORMATION |
|---|---|
| 00000000 | COLOR: BLACK  SHAPE: STRAIGHT LINE  THICKNESS: 1 |
| 00000001 | COLOR: BLACK  SHAPE: STRAIGHT LINE  THICKNESS: 3 |
| ... | ... |
| 00010100 | COLOR: RED  SHAPE: CURVE  THICKNESS: 1 |
| ... | ... |
| 00101010 | COLOR: BLUE  SHAPE: RECTANGLE  THICKNESS: 5 |
| ... | ... |
| 11111111 | COLOR: GREEN  SHAPE: STAR  THICKNESS: 7 |

| OUTPUT MEANS | CONTROL CODE B | OUTPUT SETTING INFORMATION |
|---|---|---|
| E-MAIL SENDING | 0000 | MAIL RECEPTION TERMINAL MA |
| | 0001 | MAIL RECEPTION TERMINAL MB |
| | ... | ... |
| | 1111 | MAIL RECEPTION TERMINAL MP |
| STORAGE | 00 | — |
| | 01 | USB MEMORY 71A |
| | 10 | SD CARD 71B |
| | 11 | NETWORK SERVER 60 |
| PRINTING | 00 | — |
| | 01 | USB PRINTER 80 |
| | 10 | NETWORK PRINTER 50A |
| | 11 | NETWORK PRINTER 50B |

| OUTPUT MEANS | OUTPUT SETTING INFORMATION |
|---|---|
| E-MAIL SENDING | MAIL RECEPTION TERMINAL MA |
| STORAGE | NETWORK SERVER 60 |
| PRINTING | USB PRINTER 80 |

| DISPLAY ATTRIBUTE INFORMATION ||
|---|---|
| COLOR: BLACK | SHAPE: STRAIGHT LINE |
| THICKNESS: 3 ||

DISPLAY DEVICE, DISPLAY METHOD, AND DISPLAY SYSTEM

The entire disclosure of Japanese Patent Application No. 2014-237404, filed Nov. 25, 2014, is expressly incorporated by reference herein.

BACKGROUND

1. Technical Field

The present invention relates to output of image information indicating an image to be displayed by a display device such as a projector.

2. Related Art

In a product called an interactive white board, a handwriting image of a user can be drawn using a pen type device, for example, to overlap with an image displayed on a display surface by a display device such as a projector. JP-A-2013-235416 discloses a technique that grants the authority for a process relating to a handwriting image to a device used by a user, and performs processes of storage, printing, deletion or encryption of the handwriting image according to the authority.

In the interactive white board, in many cases, data output functions for performing printing, storage, transmission, or the like of a handwriting image of a user are provided. However, an operation relating to setting of the output functions may be complicated for some users. For example, in the case of printing, a user should perform an operation of selecting a printer to be used for printing from plural usable printers. In the case of storage, a user should perform an operation of selecting any one of plural storage destinations such as a portable storage medium such as a universal serial bus (USB) memory or an SD card, and a server device on a network. When transmitting data using electronic mail, a user should perform an operation of selecting a mail address of a transmission destination from a list in which plural mail addresses are registered. For example, when a participant should promptly leave a conference room after a conference using an interactive white board, it is difficult to perform a specific setting relating to data output functions at the site.

SUMMARY

An advantage of some aspects of the invention is to provide a display device capable of simply performing setting for output of image information indicating an image to be displayed on a display surface to an output destination desired by a user in a short period of time compared with the related art.

A display device according to an aspect of the invention includes a display section that displays an image on a display surface; a communicating section that communicates with an indicator that indicates a position on the display surface; an acquiring section that acquires output destination information for specifying an output destination retained in the indicator through the communicating section; and an output control section that performs a control for outputting the image information to an output destination specified by the acquired output destination information.

According to this aspect of the invention, since the image information is output to the output destination specified by the output destination information retained in the indicator, it is possible to simply perform setting for output of image information indicating an image to be displayed on the display surface to an output destination desired by a user in a short period of time compared with the related art.

In the aspect of the invention, the display device may further include: a position detecting section that detects a position on the display surface indicated by the indicator; and a process executing section that executes a process based on the detected position.

According to the aspect of the invention with this configuration, it is possible to perform a process based on the position on the display surface indicated by the indicator.

In the aspect of the invention, the process executing section may display an image indicating a locus of the indicator on the display surface based on the detected position, and the output control section may output the image information including the image indicating the locus.

According to the aspect of the invention with this configuration, it is possible to simply output image information including an image drawn using the indicator to an output destination desired by a user in a short period of time compared with the related art.

In the aspect of the invention, the display device may further include: a setting section that sets the output destination information to the indicator, through the communicating section.

According to the aspect of the invention with this configuration, it is possible to set output destination information for the indicator using the function of the display device.

In the aspect of the invention, the output destination information may include identification information for identifying the output destination, and the display device may further include: a storage section that stores a correspondence relationship between the identification information and the output destination, and the output control section may output the image information to the output destination which is in the correspondence relationship with the acquired identification information.

According to the aspect of the invention with this configuration, since the indicator may not retain information relating to setting of the output destination, it is possible to reduce the amount of data to be retained by the indicator.

The invention may be implemented as a display method and a display system, in addition to the display device.

BRIEF DESCRIPTION OF THE DRAWINGS

The invention will be described with reference to the accompanying drawings, wherein like numbers reference like elements.

FIG. 9 is a diagram illustrating a configuration example of an output setting table according to the second embodiment.

FIG. 11 is a diagram illustrating a configuration example of data retained by an indicator according to a third embodiment of the invention.

DESCRIPTION OF EXEMPLARY EMBODIMENTS

Hereinafter, embodiments of the invention will be described with reference to the accompanying drawings.

First Embodiment

Figure 1:
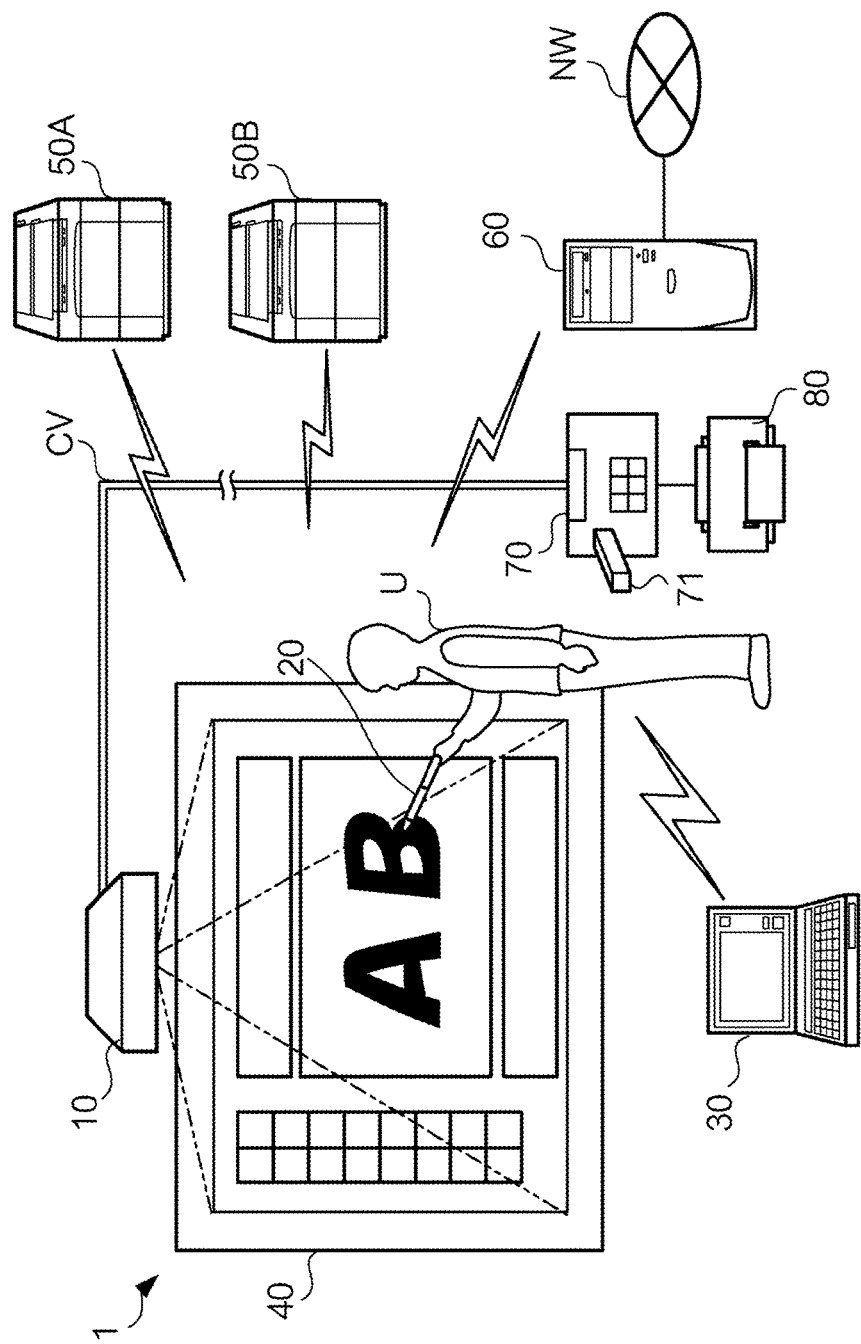
FIG. 1 is a diagram illustrating an overall configuration of a display system according to a first embodiment of the invention.

FIG. 1 is a diagram illustrating an overall configuration of a display system 1 according to a first embodiment of the invention. As shown in FIG. 1, the display system 1 includes a projector 10, an indicator 20, a personal computer (PC) 30, network printers 50A and 50B, a network server 60, an operation panel 70, and a USB printer 80.

The projector 10 is a wall hanging type short-focus projector, and is a projection type display device that projects an image on a screen 40 provided a short distance away. The projector 10 projects color images onto the screen 40 based on image signals corresponding to color components of three primary colors of red (R), green (G), and blue (B), for example. In the present embodiment, the screen 40 is a reflection type screen, which is a projection surface (that is, display surface) on which an image is projected by the projector 10. The projector 10 functions as an interactive white board, detects an operation performed using the indicator 20 by a user U with respect to the screen 40, and executes a process depending on the detected operation (for example, drawing of a handwriting image or a process based on a selected menu). The projector 10 is not limited to the wall hanging type short-focus projector, and may be an on-desk installation type projector or a suspension type projector, or may be a normal focus projector.

In the present embodiment, the indicator 20 is a pen type device (operation device), and is an indicator for indicating a position on the screen 40. The indicator 20 is used by the user U in order to perform an operation of hand writing a character or a figure or an operation of selecting a menu displayed on the screen 40. The indicator 20 is not limited to the pen type, and may be an operation device of a different shape such as a rod shape.

In FIG. 1, only one indicator 20 used by the user U is present, but an indicator 20 used by another user may be present together.

The PC 30 is an information processing apparatus which is a signal source (video source) of an image signal input to the projector 10. The PC 30 is connected to the projector 10 through a wireless local area network (LAN) (not shown) in the example shown in FIG. 1, but may be connected to a network through a wired LAN or other communication lines. Further, the PC 30 may be connected to the indicator 20 through a predetermined cable.

Each of the network printers 50A and 50B is a printer (printing device) connected to the projector 10 through a wireless LAN. If the network printers 50A and 50B receive image information transmitted by the projector 10, the network printers 50A and 50B print an image based on the received image information.

The network server 60 is a server device connected to the projector 10 through a wireless LAN. If the network server 60 receives image information transmitted by the projector 10, the network server 60 stores the received image information. Further, the network server 60 is connected to a network NW such as the Internet, and the projector 10 is connected to the network NW through the network server 60. For example, a mail server (not shown) for transmitting electronic mail by the projector 10 is connected to the network NW. The projector 10 and the network printers 50A and 50B or the network server 60 may be connected to each other through a wired LAN or other communication lines.

The operation panel 70 is an operation device for performing an operation of the projector 10, and is connected to the projector 10 through a cable CV. The operation panel 70 includes an interface for performing data input and output with an external device connected thereto, in addition to an operator (for example, physical buttons) for performing an operation of the projector 10. The operation panel 70 performs data input and output with an external storage medium 71 that is detachably mounted in the host device, for example. In the present embodiment, a USB memory 71A and an SD card 71B are used as the external storage medium 71 (see FIG. 2). Further, the operation panel 70 performs data input and output with the USB printer 80.

The USB printer 80 is a printer connected to the operation panel 70 through a USB cable. If the USB printer 80 receives image information transmitted by the projector 10 through the operation panel 70, the USB printer 80 prints an image based on the received image information. The operation panel 70 may be provided integrally with a printer body.

Figure 2:
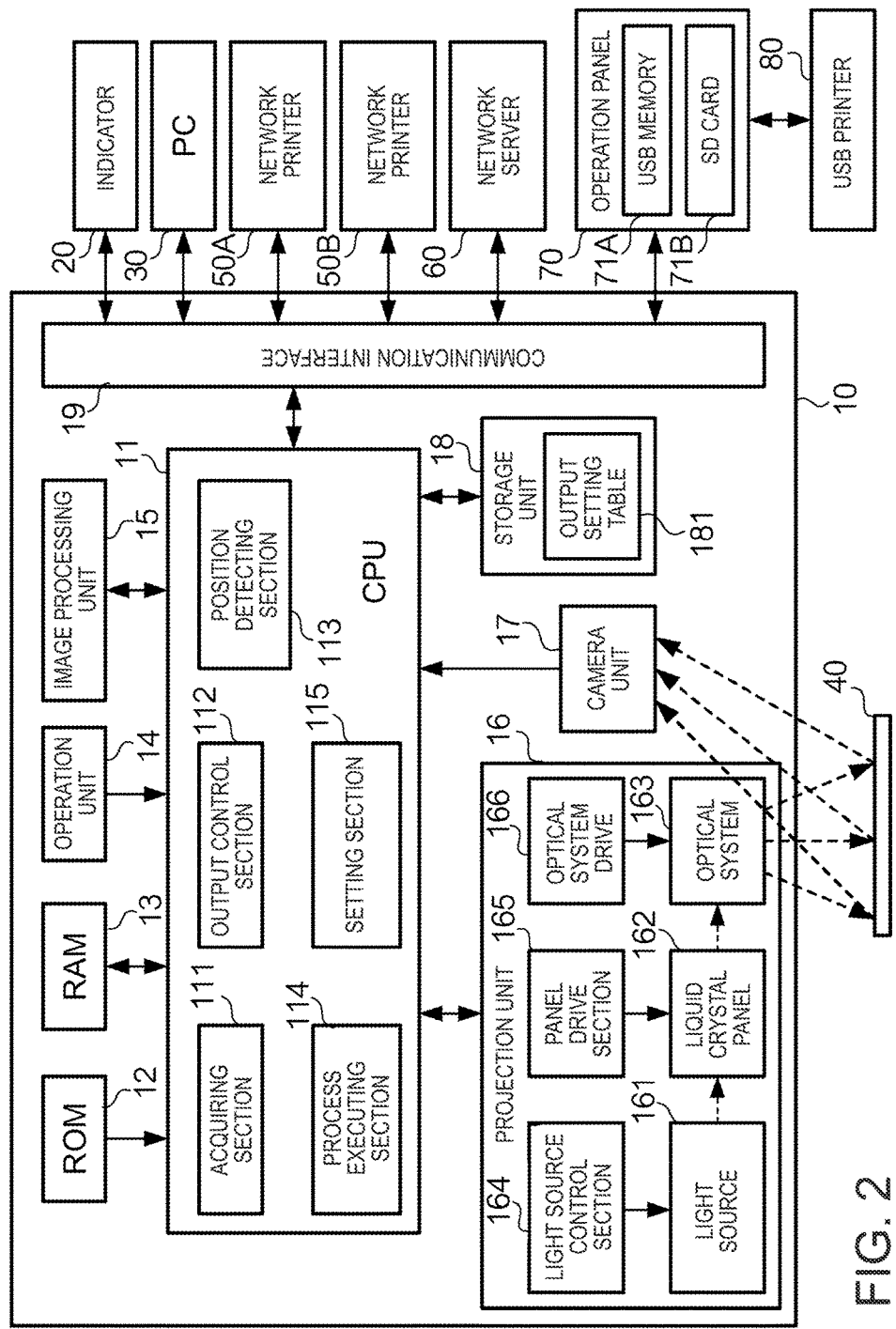
FIG. 2 is a block diagram illustrating a hardware configuration of a projector according to the first embodiment.

FIG. 2 is a block diagram illustrating a hardware configuration of the projector 10. As shown in FIG. 2, the projector 10 includes a central processing unit (CPU) 11, a read only memory (ROM) 12, a random access memory (RAM) 13, an operation unit 14, an image processing unit 15, a projection unit 16, a camera unit 17, a storage unit 18, and a communication interface 19.

The CPU 11 is a processor that reads a program stored in the ROM 12 or the storage unit 18 using the RAM 13 and executes the program to control the respective units of the projector 10. The operation unit 14 is an operation means that includes operators (for example, physical keys) for turning on or turning off a power source of the projector 10 and for performing various operations. The image processing unit 15 includes an image processing circuit such as an application specific integrated circuit (ASIC), and is in charge of image processing performed in the projector 10. The image processing unit 15 performs image processing such as resize processing or trapezoid correction, for example.

The projection unit 16 projects (displays) an image on the screen 40 based on image information after image processing in the image processing unit 15. The projection unit 16 includes a light source 161, a liquid crystal panel 162, an optical system 163, a light source control section 164, a panel drive section 165, and an optical system drive 166. The light source 161 is a solid light source that includes a light emitting diode (LED) or a semiconductor diode, for example, and emits light to the liquid crystal panel 162. The liquid crystal panel 162 is a light transmission type liquid crystal panel, for example, and is a light modulator that modules light incident from the light source 161. The liquid crystal panel 162 is provided to match the respective colors of the three primary colors of R, G, and B. The optical system 163 includes a lens and a drive circuit for lens adjustment, for example, and magnifies light (image light)

modulated by the liquid crystal panel 162 to be projected on the screen 40. The light source control section 164 drives the light source 161 under the control of the CPU 11. The panel drive section 165 drives the liquid crystal panel 162 based on an image signal supplied from the CPU 11. The optical system drive section 166 drives the drive circuit of the optical system 163 under the control of the CPU 11.

The camera unit 17 includes an image sensor (for example, a CMOS sensor or a CCD sensor), and image-captures the screen 40 under the control of the CPU 11. The CPU 11 identifies the indicator 20 based on emission light of the indicator 20 image-captured by the camera unit 17, or detects a position on the screen 40 indicated by the indicator 20.

The projector 10 may detect the indicated position based on reflection light reflected by the indicator 20 by a method using a light curtain or the like, instead of detection of the position indicated by the indicator 20 using the camera unit 17. In this case, a user's finger or the like may be used as the indicator 20.

The storage unit 18 includes a storage device such as an electrically erasable and programmable ROM (EEPROM), and stores a program to be executed by the CPU 11 and an output setting table 181.

The communication interface 19 communicates with an external device connected thereto, and functions as a communication unit that performs input and output (transmission and reception) of data with the external device. The communication interface 19 performs data input and output with each of the above-described indicator 20, the PC 30, the network printers 50A and 50B, the network server 60, the operation panel 70, and the USB printer 80. The communication interface 19 performs short-range wireless communication or infrared data communication with the indicator 20 based on Bluetooth (registered trademark), for example, to thereby perform data input and output with the indicator 20. The communication interface 19 performs communication with each of the PC 30, the network printers 50A and 50B, and the network server 60 through a wireless LAN, to thereby perform data input and output with the respective devices. The communication interface 19 performs communication with the operation panel 70 and the USB printer 80 through a cable CV, to thereby perform data input and output with the respective devices.

Figures 3, 4:
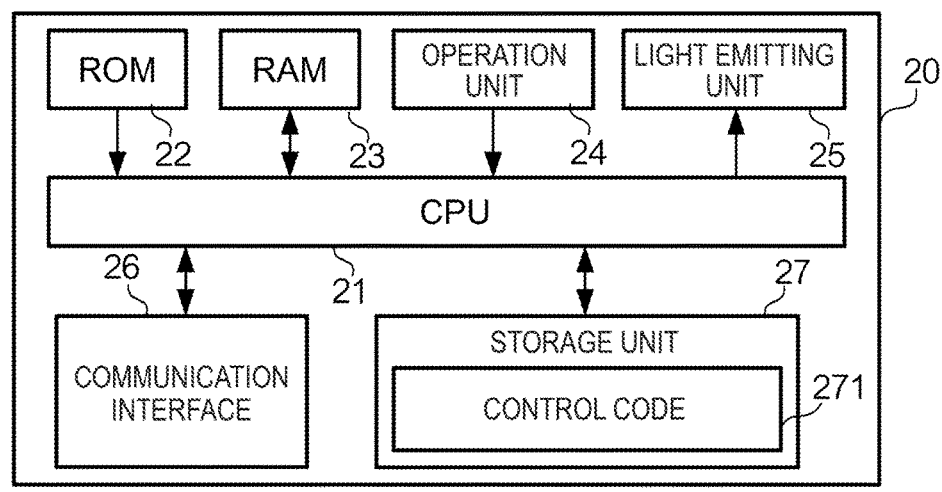
FIG. 3 is a diagram illustrating a configuration example of an output setting table according to the first embodiment.
FIG. 4 is a block diagram illustrating a hardware configuration of an indicator according to the first embodiment.

FIG. 3 is a diagram illustrating a configuration example of the output setting table 181 stored in the storage unit 18.

As shown in FIG. 3, in the output setting table 181, respective pieces of information of output means, a control code, and output setting information are stored in association.

The output means refers to means used for output of image information indicating an image to be projected onto the screen 40. Specifically, the output means of the present embodiment includes "printing", "storage", "e-mail sending", and the like. Here, "printing" refers to means for outputting image information to an external printer which is an output destination in order to print an image indicated by the image information. "Storage" refers to means for outputting image information to an external storage medium which is an output destination in order to store the image information. "E-mail sending" refers to means for outputting image information (electronic mail) to a network NW (mail reception terminal) which is an output destination in order to transmit the image information using electronic mail. The output means is not limited to the above-described examples.

The control code refers to data indicated by any value of "0" to "5", which is a decimal number, and is an example of output destination information for specifying an output destination of image information. The output setting information is associated with the control code on a one-to-one basis, and represents setting content of the output destination of the image information. In the example of FIG. 3, for ease of illustration, names of the output destinations of the image information are represented as the output setting information.

When the output means is "printing", the output setting information includes information on an address (IP address) allocated to a printer which is an output destination, a printer name, a color mode, sheet selection, and the like. When the output means is "storage", the output setting information includes information on an address (IP address) allocated to a storage device which is an output destination, the presence or absence of compression of a storage format (file format), and the like. When the output means is "e-mail sending", the output setting information includes information on an address (IP address) allocated to a device (mail server) which is an output destination, a server name, a port number, and the like, and an address of a transmission destination of electronic mail.

In the output setting table 181 shown in FIG. 3, two control codes and two types of output setting information are associated with each of the output means of "printing", "storage", and "e-mail sending".

Here, functions realized by the CPU 11 executing a program will be described. The CPU 11 realizes functions corresponding to an acquiring section 111, an output control section 112, a position detecting section 113, a process executing section 114, and a setting section 115, as shown in FIG. 2.

When output of image information indicating an image to be displayed on the screen 40 is instructed using the indicator 20, the acquiring section 111 acquires output destination information for specifying an output destination stored in the indicator 20 through the communication interface 19. In the present embodiment, the acquiring section 111 acquires a control code as the output destination information.

The output control section 112 performs a control for outputting the image information to the output destination specified by the output destination information (control code) acquired by the acquiring section 111. In the present embodiment, the output control section 112 acquires output setting information associated with the acquired control code from the output setting table 181, and outputs the image information using the acquired output setting information.

The position detecting section 113 detects a position on the screen 40 indicated by the indicator 20 based on emission light of the indicator 20 image-captured by the camera unit 17.

The process executing section 114 executes a process based on the position indicated by the indicator 20, detected by the position detecting section 113. The process executing section 114 generates an image indicating a locus of the indicator 20 (hereinafter, referred to as a "locus image"), for example, and draws (displays) the locus image on the screen 40. Further, if an operation of selecting a menu displayed on the screen 40 using the indicator 20 is detected, the process executing section 114 executes a process based on the selected menu.

The setting section 115 sets output destination information (control code) with respect to the indicator 20 through the communication interface 19. The setting section 115 sets output destination information based on an operation of the operation panel 70 or data received from the PC 30. The output destination information may be set in the indicator 20 by communication between the PC 30 and the indicator 20, and in this case, the function of the setting section 115 may be omitted.

FIG. 4 is a block diagram illustrating a hardware configuration of the indicator 20. As shown in FIG. 4, the indicator 20 includes a CPU 21, a ROM 22, a RAM 23, an operation unit 24, a light emitting unit 25, a communication interface 26, and a storage unit 27.

The CPU 21 is a processor that reads a program stored in the ROM 22 using the RAM 23 and executes the program to control the respective units of the projector 10. The operation unit 24 is operation means that includes operators (for example, physical keys) for performing various operations. The light emitting unit 25 includes a light emitting diode that emits infrared light, and is turned on or turned off under the control of the CPU 21. The communication interface 26 is a communication unit that performs communication (wireless communication) with the projector 10 to perform data input and output with the projector 10. The communication interface 26 receives a signal transmitted from the projector 10 using infrared light, for example. Further, the communication interface 26 may perform short-range wireless communication based on Bluetooth with the indicator 20 to perform data input and output with the indicator 20. The storage unit 27 stores (retains) a control code 271 as output destination information for specifying an output destination of image information.

Figures 5A, 5B:
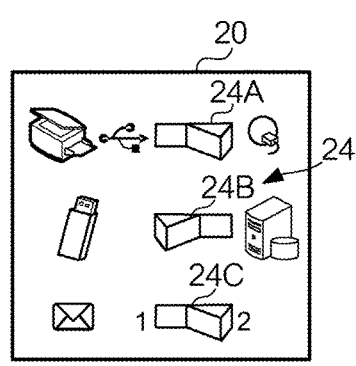
FIGS. 5A and 5B are diagrams illustrating a function of the indicator according to the first embodiment.

FIGS. 5A and 5B are diagrams illustrating functions of the operation unit 24. FIG. 5A is a diagram illustrating an appearance configuration of the operation unit 24, and FIG. 5B is a diagram illustrating a relationship between each operator of the operation unit 24 and the control code 271 to be used.

As shown in FIG. 5A, the operation unit 24 includes operators 24A, 24B, and 24C provided in a housing of the indicator 20. Each of the operators 24A, 24B, and 24C is a seesaw switch (locker switch), and is provided one to one corresponding to each of the output means in the projector 10. The operator 24A corresponds to the "printing" as the output means, and is an operator for setting a control code corresponding to "printing" to "0" indicating that a USB printer is an output destination or to "1" indicating that a network printer is an output destination. The operator 24B corresponds to "storage" as the output means, and is an operator for setting a control code corresponding to "storage" to "2" indicating that a USB memory is an output destination or to "3" indicating that a network server is an output destination. The operator 24C corresponds to "e-mail sending" as the output means, and is an operator for setting a control code corresponding to "e-mail sending" to "4" indicating that an output destination of electronic mail is a first output destination or to "5" indicating that an output destination of electronic mail is a second output destination.

The CPU 21 reads the control codes depending on the states of the operators 24A, 24B, and 24C from the storage unit 27, and transmits the result to the projector 10 through the communication interface 26.

Each of the operators 24A, 24B, and 24C is not limited to the seesaw switch, and another switch (operator) of a dial type or a toggle switch type, a touch panel type, or the like may be employed.

Figure 6:
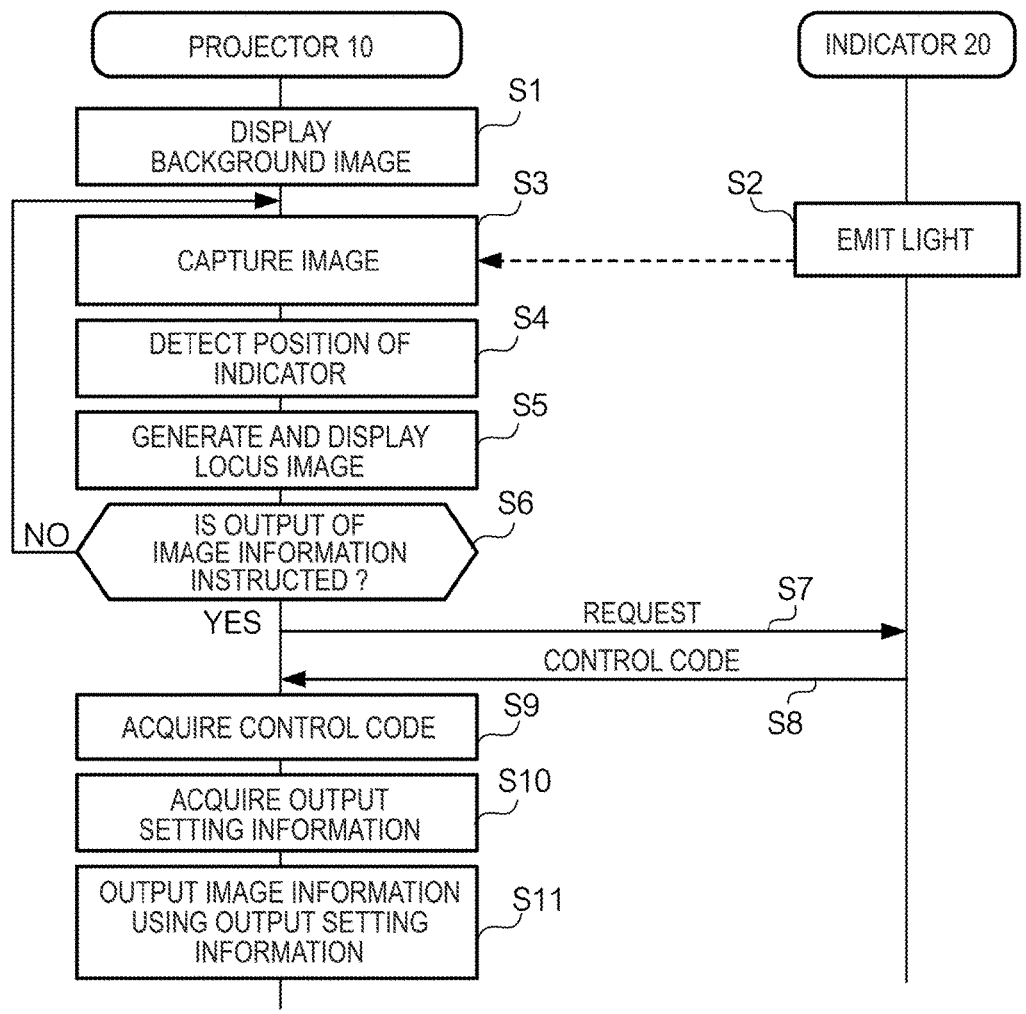
FIG. 6 is a sequence diagram illustrating an operation of the display system according to the first embodiment.

FIG. 6 is a sequence diagram illustrating an operation of the display system 1.

The CPU 11 of the projector 10 controls the projection unit 16 based on an image signal acquired from the PC 30 through the communication interface 19, and displays a background image on the screen 40 (step S1). If a power source is turned on, the CPU 21 of the indicator 20 starts light emission using the light emitting unit 25 (step S2). The CPU 21 controls the light emitting unit 25 to repeat light emission and lighting off in a unique pattern with respect to the host device so that the indicator 20 can be uniquely identified, for example.

If the emission light of the indicator 20 is image-captured by the camera unit 17 (step S3), the CPU 11 analyzes the captured image to detect the position of the indicator 20 indicating a point on the screen 40 (step S4). Here, the CPU 21 generates identification information for identifying the indicator 20 and position information (coordinate information) indicating the position indicated by the indicator 20 on the screen 40.

Then, the CPU 11 generates locus image indicating a locus of the positions on the screen 40 indicated by the indicator 20, and controls the projection unit 16 to draw (display) the locus image so that the locus image overlaps with the background image (step S5). The CPU 11 stores image information obtained by combining the background image and the locus image in the storage unit 18.

Figure 7:
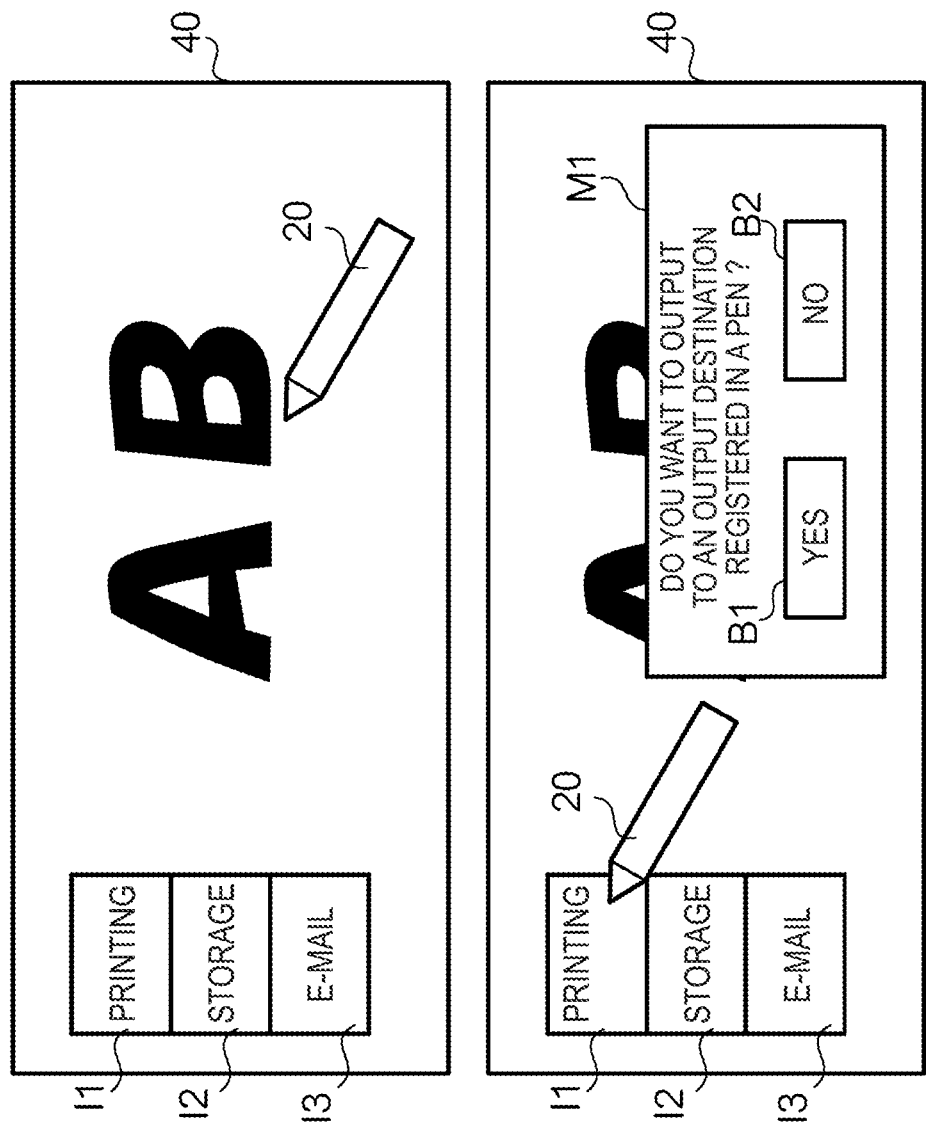
FIGS. 7A and 7B are diagrams illustrating a menu screen displayed by the projector according to the first embodiment.

Then, the CPU 11 determines whether or not output of image information indicating an image to be displayed on the screen 40 is instructed using the indicator 20 (step S6). If an operation of selecting any one of an icon I1 corresponding to the output means "printing", an icon I2 corresponding to the output means "storage", and an icon I3 corresponding to the output means "e-mail sending", which are displayed on the screen 40, is detected, as shown in FIG. 7A, the CPU 11 determines that the output means corresponding to the selected icon is used. If any one of the icons I1 to I3 is selected, the CPU 11 displays a menu screen M1 shown in FIG. 7B on the screen 40. As shown in FIG. 7B, the menu screen M1 includes a message "Do you want to output to an output destination registered in a pen?", a soft button B1 displayed as "YES", and a soft button B2 displayed as "NO".

When the operation of selecting the icons I1 to I3 is not detected, or when an operation of selecting the soft button B2 of the menu screen M1 is not detected, the CPU 11 determines that the result is "NO" in step S6, and returns to the process of step S1.

When an operation of selecting the soft button B1 of the menu screen M1 is detected, the CPU 11 determines that the result is "YES" in step S6, and proceeds to a process of step S7. Then, the CPU 11 requests transmission of a control code from the indicator 20 through the communication interface 19 (step S7). If the control code request is acquired through the communication interface 26, the CPU 21 of the indicator 20 transmits control codes depending on circumstances of the operations of the operators 24A, 24B, and 24C among the control codes 271 stored in the storage unit 27 to the projector 10 in response to the request (step S8). When the operators 24A, 24B, and 24C are in the states shown in FIG. 5A, the CPU 21 transmits "0", "3", and "4" as the control codes.

Since the amount of information of the control codes is relatively small, the CPU 21 transmits the control codes through infrared communication, for example. Further, if information on the output means to be used is included in the request transmitted in step S7, the indicator 20 may transmit a control code corresponding to the output means.

The CPU 11 of the projector 10 acquires the control code from the indicator 20 through the communication interface (step S9). Then, the CPU 11 acquires output setting information associated with the acquired control code from the output setting table 181 (step S10). Here, the CPU 11 acquires output setting information associated with output means determined to be used. For example, when "printing" is used as the output means, the CPU 11 acquires output setting information on the USB printer 80 associated with the control code "0". When "storage" is used as the output means, the CPU 11 acquires output setting information on the network server 60 associated with the control code "3". When "e-mail sending" is used as the output means, the CPU 11 acquires output setting information on a mail reception terminal MA associated with the control code "4".

Then, the CPU 11 outputs image information indicating the image to be displayed on the screen 40 using the output setting information acquired in step S10 (step S11). The CPU 11 reads image information indicating all screens displayed during a conference or all screens including a locus image, for example, in addition to image information indicating a screen which is currently displayed, from the storage unit 18 for transmission.

In step S11, when "printing" is used as the output means, the CPU 11 transmits (outputs) the image information to the USB printer 80 through the communication interface 19, and causes the USB printer 80 to print an image indicated by the image information. When "storage" is used as the output means, the CPU 11 transmits (outputs) the image information to the network server 60 through the communication interface 19, and stores the image information. When "e-mail sending" is used as the output means, the CPU 11 transmits (outputs) an e-mail to which the image information is attached to the network NW (mail server) through the communication interface 19 in order to transmit the image information to the mail reception terminal MA.

According to the display system 1 of the above-described first embodiment, the user U can select an image information output destination by the operations of the operators 24A, 24B, and 24C of the indicator 20. The projector 10 acquires the control codes depending on the states of the operations of the operators 24A, 24B, and 24C from the indicator 20, and performs a control for outputting image information using the output setting information associated with the acquired control codes. Accordingly, according to the display system 1, it is not necessary that the user U operates a menu displayed on the screen 40 whenever image information is output to perform setting of an output destination. Accordingly, the user U can simply perform setting for output of image information to a desired output destination in a short period of time compared with the related art.

Second Embodiment

In the first embodiment, the output destination is selected according to the state of the operation of the operation unit 24 of the indicator 20, but in the second embodiment, an output destination is selected by data stored in the storage unit 27 of the indicator 20. In the present embodiment, components with the same reference numerals as in the first embodiment have the same functions as in the first embodiment, and components with "A" at the end of the reference numerals realize functions corresponding to the respective components described in the first embodiment.

Figure 8:
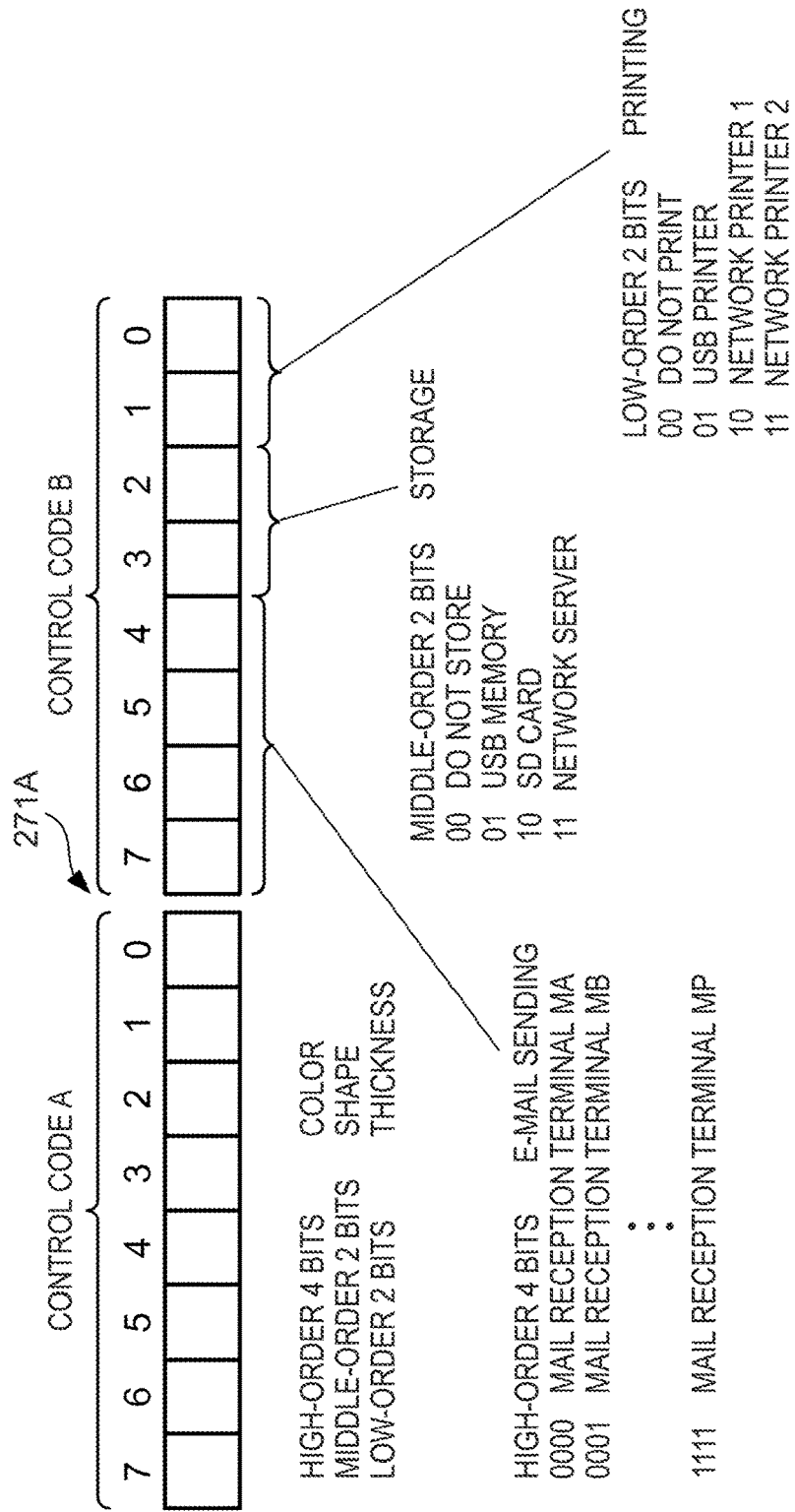
FIG. 8 is a diagram illustrating a configuration example of data retained by an indicator according to a second embodiment of the invention.

FIG. 8 is a diagram illustrating a configuration example of a control code 271A stored in the storage unit 27. As shown in FIG. 8, the control code 271A is configured by 16-bit (2 byte) information. High-order 8 bits (1 byte) among the control code 271A represent information for specifying a display attribute of a locus image, which is referred to as "control code A". The display attribute refers to information for designating an attribute of display of the locus image, which designates a mode of display of the locus image. High-order 4 bits among the control code A correspond to the color of the locus image, middle-order 2 bits correspond to the shape of the locus image, and low-order 2 bits correspond to the thickness of the locus image. Low-order 8 bits (1 byte) among the control code 271A represent information for specifying an output destination of image information, which is referred to as "control code B". High-order 4 bits among the control code B are used to identify an output destination in the output means "e-mail sending", middle-order 2 bits are used to identify an output destination in the output means "storage", and low-order 2 bits are used to identify an output destination in the output means "printing".

The control code 271A is set in advance based on an operation of the operation panel 70 or data received from the PC 30. In the present embodiment, the control code 271A may be set in the indicator 20 by communication between the PC 30 and the indicator 20.

FIG. 9 is a diagram illustrating a configuration example of an output setting table 181A stored in the storage unit 18.

As shown in FIG. 9, information indicating a correspondence relationship between the control code A and display attribute information indicating a display attribute of a locus image, and information indicating a correspondence relationship between the control code B and output setting information is stored in the output setting table 181A. In the first embodiment, two output destinations are designated per output means, but in the present embodiment, a large number of output destinations may be designated by a number according to the number of bits of the control code B, compared with the first embodiment. For example, since an output destination of an electronic mail is identified by 4-bit information in the present embodiment, any one of total 16 transmission destinations of mail reception terminals MA to MP is selected. Further, in the present embodiment, since the display attribute is designated by the control code A, it is possible to draw the locus image using a display attribute according to a user who uses the indicator 20.

Figure 10:
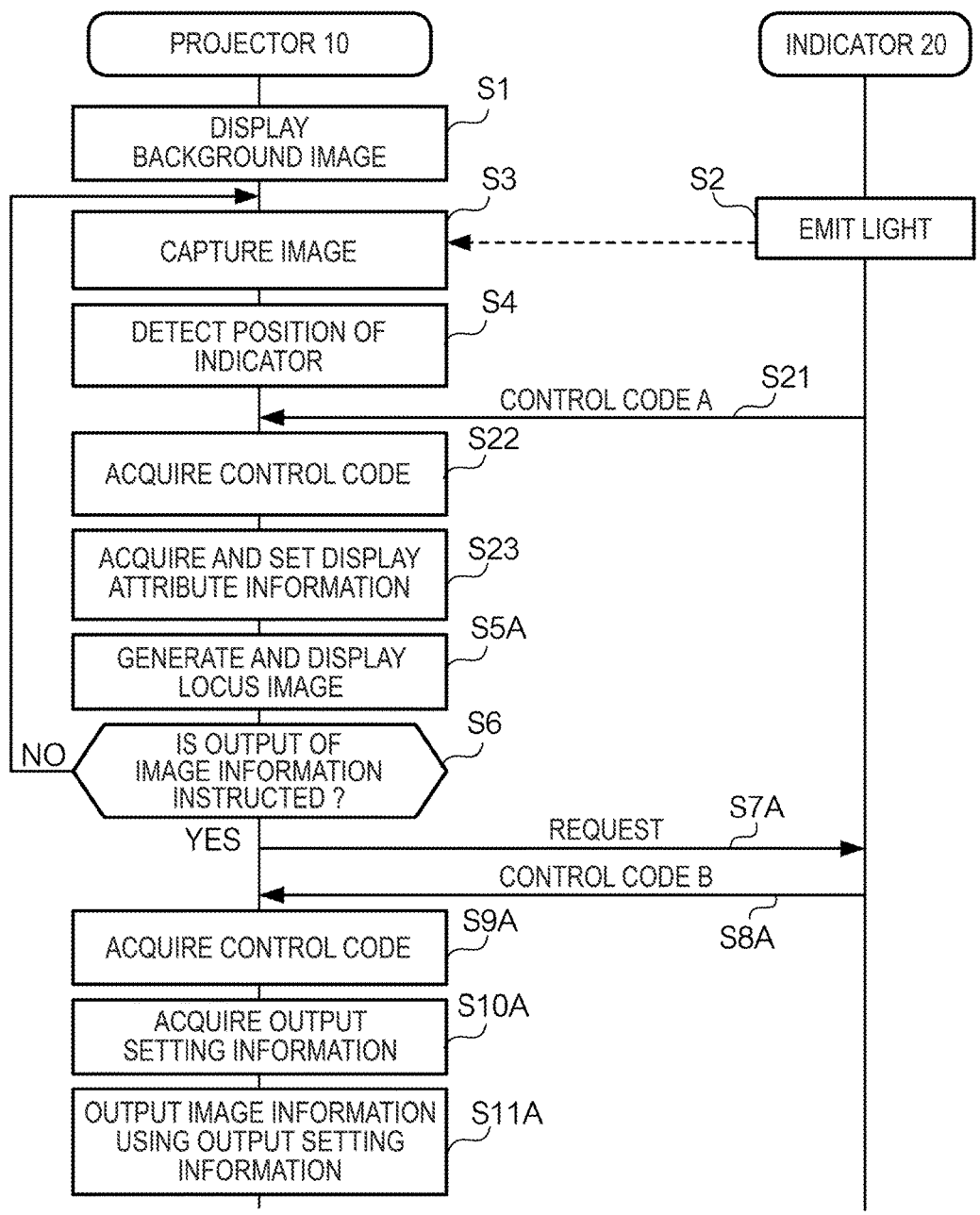
FIG. 10 is a sequence diagram illustrating an operation of a display system according to the second embodiment.

FIG. 10 is a sequence diagram illustrating an operation of the display system 1.

The CPU 11 of the projector 10 controls the projection unit 16 based on an image signal acquired from the PC 30 through the communication interface 19, and displays a background image on the screen 40 (step S1). If the power source is turned on, the CPU 21 of the indicator 20 starts light emission using the light emitting unit 25 (step S2). Then, if the emission light of the indicator 20 is imaged (captured) by the camera unit 17 (step S3), the CPU 11 analyzes the captured image to detect the position of the indicator indicating a point on the screen 40 (step S4).

Then, the CPU 21 of the indicator 20 transmits the control code A stored in the storage unit 27 to the projector 10 through the communication interface 26 (step S21). If the control code A transmitted in step S21 is acquired through the communication interface 19 (step S22), the CPU 11 acquires display attribute information associated with the acquired control code A from the output setting table 181A, and sets the acquired display attribute information (step S23). Further, the CPU 11 generates a locus image indicating a locus of the positions on the screen 40 indicated by the indicator 20, and controls the projection unit 16 to draw (display) the generated image so that the locus image overlaps with the background image (step S5A). Here, the CPU 11 generates the locus image according to the display attribute represented by the display attribute information acquired in step S23.

Then, the CPU 11 determines whether output of image information indicating an image to be displayed on the screen 40 is instructed using the indicator 20 (step S6). When the determination result in step S6 is "YES", the CPU 11 requests transmission of the control code B from the indicator 20 through the communication interface 19 (step S7A). If the request is acquired through the communication interface 26, the CPU 21 of the indicator 20 transmits the control code B to the projector 10 in response to the request (step S8A).

The CPU 11 of the projector 10 acquires the control code B from the indicator 20 through the communication interface 19 (step S9A). Then, the CPU 11 acquires output setting information associated with the acquired control code B from an output setting table 181A (step S10A). Here, the CPU 11 acquires the output setting information corresponding to output means to be used. Further, the CPU 11 outputs the image information indicating the image to be displayed on the screen 40 using the output setting information acquired in step S10A (step S11A).

For example, when high-order 4 bits of the control code B are "1111", and when "e-mail sending" is used as the output means, the CPU 11 transmits (outputs) the image information using a mail address of a mail reception terminal MP acquired from the output setting table 181A. When middle-order 2 bits of the control code B are "01", and when "storage" is used as the output means, the CPU 11 outputs the image information to the USB memory 71 using output setting information acquired from the output setting table 181A. When low-order 2 bits of the control code B are "01", and when "printing" is used as the output means, the CPU 11 transmits (outputs) the image information to the USB printer 80 using output setting information acquired from the output setting table 181A.

In the display system of the second embodiment, it is possible to select an output destination of image information by the control code B stored in the indicator 20. Accordingly, in the display system, similar to the first embodiment, it is possible to simply perform setting for output of image information to a desired output destination in a short period of time compared with the related art. Further, according to the display system of the present embodiment, since the display attribute of the locus image is controlled by the control code A from the indicator 20, it is not necessary that the user U selects the display attribute of the locus image again. Further, since the amount of information of the control code 271A is relatively small, it is possible to suppress a capacity increase of a storage region of the storage unit 27.

Third Embodiment

In the second embodiment, the control code 271A is stored in the storage unit 27 of the indicator 20, and the projector 10 acquires output setting information based on the control code 271A and the output setting table 181A of the projector 10. Instead, setting information 271B including output setting information may be retained by the indicator 20. In the present embodiment, components with the same reference numerals as in the second embodiment have functions equivalent to those of the second embodiment, components with "B" at the end of the reference numerals realize functions corresponding to the respective components described in the second embodiment.

FIG. 11 is a diagram illustrating a configuration example of the setting information 271B stored in the storage unit 27. As shown in FIG. 11, the setting information 271B includes display attribute information and output setting information. The display attribute information has the same configuration as that of the display attribute information stored in the output setting table 181A of the second embodiment. The output setting information has the same configuration as that of the output setting information stored in the output setting table 181A of the second embodiment, and in the present embodiment, a set of output setting information is stored for each output means of image information.

The setting information 271B is set in advance based on an operation of the operation panel 70 or data received from the PC 30. In the present embodiment, similarly, the setting information 271B may be set in the indicator 20 by communication between the PC 30 and the indicator 20.

Figure 12:
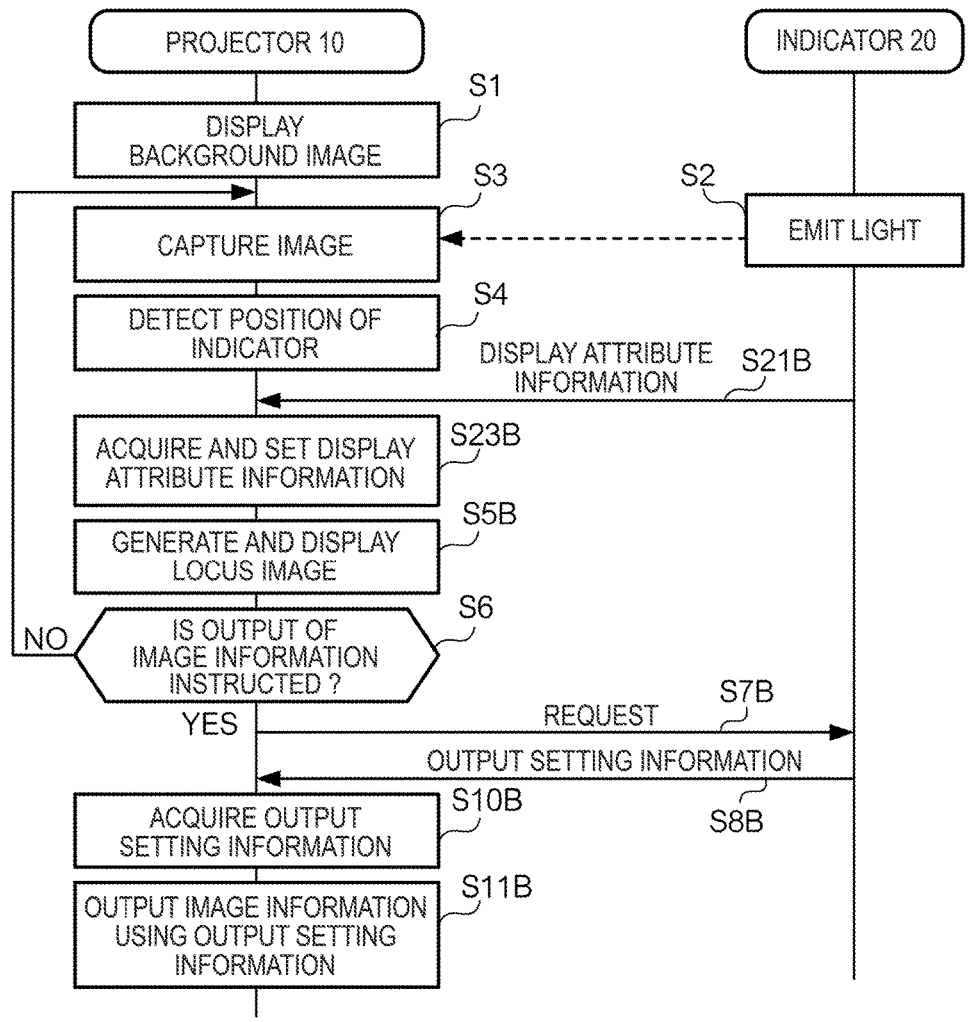
FIG. 12 is a sequence diagram illustrating an operation of a display system according to the third embodiment.

FIG. 12 is a sequence diagram illustrating an operation of the display system 1.

The CPU 11 of the projector 10 controls the projection unit 16 based on an image signal acquired from the PC 30 through the communication interface 19, and displays a background image on the screen 40 (step S1). If the power source is turned on, the CPU 21 of the indicator 20 starts light emission using the light emitting unit 25 (step S2). Then, if the emission light of the indicator 20 is imaged (captured) by the camera unit 17 (step S3), the CPU 11 analyzes the captured image to detect the position of the indicator indicating a point on the screen 40 (step S4).

Then, the CPU 21 of the indicator 20 transmits display attribute information of the setting information 271B stored in the storage unit 27 to the projector 10 through the communication interface 26 (step S21B). The CPU 11 acquires the display attribute information transmitted in step S21B, and sets the acquired display attribute information (step S23B). Further, the CPU 21 generates a locus image indicating a locus of the positions on the screen 40 indicated by the indicator 20, and controls the projection unit 16 to draw (display) locus image so that the locus image overlaps with the background image (step S5B). Here, the CPU 11 generates a locus image according to the display attribute indicated by the display attribute information acquired in step S23B.

Then, the CPU 11 determines whether or not output of image information indicating an image to be displayed on the screen 40 is instructed (step S6). When the determination result in step S6 is "YES", the CPU 11 requests transmission of output setting information from the indicator 20 through the communication interface 19 (step S7B). If the output setting information request is acquired through the communication interface 26, the CPU 21 of the indicator 20 transmits the output setting information of the setting information 271B to the projector 10 in response to the request (step S8B).

The CPU 11 of the projector 10 acquires the output setting information from the indicator 20 through the communication interface 19 (step S10B), and outputs image information indicating the image displayed on the screen 40 using the acquired output setting information (step S11B).

For example, when "e-mail sending" is used as the output means, the CPU 11 transmits (outputs) the image information using a mail address of a mail reception terminal MA. When "storage" is used as the output means, the CPU 11 transmits (outputs) the image information to the network server 60. When "printing" is used as the output means, the CPU 11 transmits (outputs) the image information to the USB printer 80.

According to the display system of the above-described third embodiment, similar to the second embodiment, it is possible to simply perform setting for output of image information to a desired output destination in a short period of time compared with the related art. Further, since the output setting information is retained in the indicator 20 in the display system of the present embodiment, the projector 10 may not store the output setting table 181A. For example, in the output means "e-mail sending", there is a possibility that a large number of candidates of transmission destinations of an electronic mail are present, but it is possible to transmit image information to a desired transmission destination of the user U without setting a mail address with respect to the projector 10.

Modification Examples

The invention may be realized in modes different from the above-described embodiments. Further, each of the above-described embodiments and each of the following modification examples may be appropriately combined.

In the first embodiment, two output destinations are associated with one means in the indicator 20, but three or more output destinations may be selected with respect to one means. Further, in the first embodiment, display attribute information may be set in advance by a combination of the second embodiment or third embodiment.

In the second embodiment, the control code retained in the indicator 20 may be identification information for uniquely identifying the indicator 20. In this case, in the output setting table 181A, display attribute information and output setting information are stored in association with the identification information on the indicator 20.

In the above-described respective embodiments, when "e-mail sending" is selected as the output means, and when a mail address of a transmission destination is not set in advance, the projector 10 may transmit image information using a predetermined mail address. Further, an output destination when "storage" is used as the output means may be the storage unit 27 of the indicator 20.

When plural output destinations are specified by output destination information retained by the indicator 20, the CPU 21 displays a certain destination to be used among the plural output destinations on the screen 40 as a predetermined menu screen, for example, so that the user U can select the destination. In this case, since candidates of the output destinations are narrowed down to some extent for each indicator 20, an operation burden laid on the user is reduced.

A method for setting information to the indicator 20 is not particularly limited. For example, the indicator 20 may read a coded image formed of two-dimensional codes or the like, and may set output destination information acquired from the coded image.

In the above-described embodiments, a front projection type projector is employed as the display device, but the display device may employ a rear projection type projector, a liquid crystal display, or the like, for example. The light source 161 may employ a discharge lamp such as a mercury lamp. The liquid crystal panel 162 may employ a reflection type liquid crystal panel. Further, a micro-mirror array device, or the like may be employed instead of the liquid crystal panel 162.

As a method for detecting the position of the indicator 20, a method based on imaging (capturing) by means of the camera unit 17, a method using a light curtain, or the like is used as described above, but both of the methods may be used together. In this case, it is possible to recognize an indicator that detects the position by emission light of a pen or the like and an indicator that detects the position by reflection light of a user's finger or the like, as separate indicators, and thus, it is possible to allocate output setting based on the user's finger to a specific output destination, for example. In other words, the position detection based on the reflection light corresponds to acquisition of output destination information for specifying an output destination retained in the indicator.

In the above-described embodiments, the respective functions realized by the CPU 11 of the projector 10 may be realized by combination of plural programs, or may be realized by association of plural hardware resources. Further, when the functions of the CPU 11 are realized by a program, the program may be provided in a state of being stored in a computer-readable recording medium such as a magnetic recording medium (magnetic tape, magnetic disk (hard disk drive (HDD), flexible disk (FD), or the like), an optical recording medium (optical disc or the like), a magneto-optical recording medium, or a semiconductor memory, or may be distributed through a network. Further, the invention may be understood as a display method.

What is claimed is:

1. A display device comprising: a display section that displays an image on a display surface; a communication interface that communicates with an indicator that indicates a position on the display surface; and at least one processor that executes one or more programs to realize one or more functions of: an acquiring section that acquires output destination information from the indicator by way of the communication interface, the output destination information including control codes that are stored in the indicator, each control code included in the control codes corresponding to an output destination, including a plurality of categories of output destinations, each category of output destinations included in the plurality of categories of output destinations including one or more output destinations, and one category of output destinations included in the plurality of categories of output destinations including a first output destination and a second output destination, and specifying one of the first output destination and the second output destination as a selected output destination for image information; and an output control section that performs a control for outputting the image information to the one of the first output destination and the second output destination specified by the acquired output destination information.

2. The display device according to claim 1, wherein the at least one processor further executes the one or more programs to realize one or more functions of:
   a position detecting section that detects a position on the display surface indicated by the indicator; and
   a process executing section that executes a process based on the detected position.

3. The display device according to claim 2,
   wherein the process executing section displays an image indicating a locus of the indicator on the display surface based on the detected position, and
   wherein the output control section outputs the image information including the image indicating the locus.

4. The display device according to claim 1, wherein the at least one processor further executes the one or more programs to realize one or more functions of:

a setting section that sets the output destination information to the indicator, through the communicating section.

5. The display device according to claim 1, wherein the display device further comprises: a storage unit that stores a correspondence relationship between the control codes and corresponding output destinations, and wherein the output control section outputs the image information to the output destination which is in the correspondence relationship with the acquired identification information.

6. A display method in a display device that communicates with an indicator that indicates a position on a display surface on which an image is displayed by a display section, the method comprising: acquiring output destination information from the indicator, the output destination information including control codes that are stored in the indicator, each control code included in the control codes corresponding to an output destination, including a plurality of categories of output destinations, each category of output destinations included in the plurality of categories of output destinations including one or more output destinations, and one category of output destinations included in the plurality of categories of output destinations including a first output destination and a second output destination, and specifying one of the first output destination and the second output destination as a selected output destination for image information; and performing a control for outputting the image information to the one of the first output destination and the second output destination specified by the acquired output destination information.

7. A display system comprising: a display device; and an indicator, wherein the display device includes a display section that displays an image on a display surface, a communication interface that communicates with the indicator, and at least one processor that executes one or more programs to realize one or more functions of an acquiring section that acquires output destination information from the indicator by way of the communication interface, the output destination information including control codes that are stored in the indicator, each control code included in the control codes corresponding to an output destination, including a plurality of categories of output destinations, each category of output destinations included in the plurality of categories of output destinations including one or more output destinations, and one category of output destinations included in the plurality of categories of output destinations including a first output destination and a second output destination, and specifying one of the first output destination and the second output destination as a selected output destination for image information, and an output control section that performs a control for outputting the image information to the one of the first output destination and the second output destination specified by the acquired output destination information, and wherein the indicator includes a transmitting section that transmits the output destination information to the display device.

8. The display device according to claim 1, wherein the output destination information stored in the indicator is mapped to an address of the output destination.

* * * * *